US006829519B2

(12) United States Patent
Liberty et al.

(10) Patent No.: US 6,829,519 B2
(45) Date of Patent: Dec. 7, 2004

(54) SYSTEMS FOR ASSEMBLING MAILINGS AND METHODS FOR EXTERNAL CONTROL THEREOF

(75) Inventors: Kelly A. Liberty, Omaha, NE (US); Dan Oswald, Papillion, NE (US); Gerald F. Gross, Omaha, NE (US); Michelle Marie Ellwanger, Omaha, NE (US); Clinton W. Johnson, Ft. Calhoun, NE (US)

(73) Assignee: First Data Corporation, Englewood, CO (US)

( * ) Notice: Subject to any disclaimer, the term of this patent is extended or adjusted under 35 U.S.C. 154(b) by 93 days.

(21) Appl. No.: 10/417,887

(22) Filed: Apr. 14, 2003

(65) Prior Publication Data

US 2004/0204788 A1 Oct. 14, 2004

(51) Int. Cl.$^{7}$ .................................................. G06F 7/00
(52) U.S. Cl. ........................................ 700/220; 700/223
(58) Field of Search ................................ 700/220, 221, 700/223; 53/493, 266.1, 284.3, 154

(56) References Cited

U.S. PATENT DOCUMENTS

| | | | |
|---|---|---|---|
| 3,773,314 | A | 11/1973 | Giovannini |
| 3,905,593 | A | 9/1975 | Behn |
| 4,643,705 | A | 2/1987 | Bober |
| 4,905,977 | A | 3/1990 | Vijuk |
| 5,034,985 | A | 7/1991 | Keough |
| 5,076,556 | A | 12/1991 | Mandel |
| 5,125,214 | A | 6/1992 | Orsinger et al. |
| 5,177,687 | A | 1/1993 | Baggarly et al. |
| 5,220,770 | A | 6/1993 | Szewczyk et al. |
| 5,264,665 | A | 11/1993 | Delfer, III |
| RE34,483 | E | 12/1993 | Bowman et al. |
| 5,327,701 | A | 7/1994 | Dronsfield |
| 5,388,815 | A | 2/1995 | Hill et al. |
| 5,659,481 | A | 8/1997 | Qutub et al. |
| 5,667,210 | A | 9/1997 | DeLise, Jr. |
| 5,704,602 | A | 1/1998 | Taylor et al. |
| 5,709,374 | A | 1/1998 | Taylor et al. |

(List continued on next page.)

FOREIGN PATENT DOCUMENTS

EP 0621563 A1 10/1994

OTHER PUBLICATIONS

Unknown Author, *HCL Infosystems to market Pitney Bowes electronic inserting*, Dec. 14, 2000, www.financialexpress.com, 2 pages.

Unknown Author, *Pitney Bowes exhibits low and mid range products at IDMF*, Mar. 2002, www.pitneybowes.co.uk., 3 pages.

(List continued on next page.)

*Primary Examiner*—Gene O. Crawford
(74) *Attorney, Agent, or Firm*—Townsend & Townsend and Crew LLP

(57) ABSTRACT

Systems and methods for selecting inserts. In some cases, the inserts can be advertisements or offers, and the inserts are included with an offer item that can be, for example, a scheduled bill or other planned mailing. In particular cases, the systems can include a multi-bay insert holder, an offer item, and an associated offer item holder. A microprocessor associated with a computer readable medium is included with instructions executable by the microprocessor to: receive an external tickler, receive a decision rule, receive a decision information, apply the decision rule to the decision information, and send a control signal to the multi-bay insert holder. The control signal indicates an insert associated with the multi-bay insert holder to be placed in the offer item. Various methods are also disclosed for associating inserts with offer items.

26 Claims, 8 Drawing Sheets

U.S. PATENT DOCUMENTS

| | | | | | |
|---|---|---|---|---|---|
| 5,724,791 | A | | 3/1998 | Pishny et al. | |
| 5,730,299 | A | | 3/1998 | Helsley | |
| 5,754,434 | A | | 5/1998 | Delfer et al. | |
| 6,074,332 | A | | 6/2000 | Helmstadter et al. | |
| 6,094,894 | A | | 8/2000 | Yates | |
| 6,119,051 | A | * | 9/2000 | Anderson et al. | 700/221 |
| 6,164,043 | A | | 12/2000 | Miller et al. | |
| 6,202,005 | B1 | | 3/2001 | Mahaffey | |
| 6,266,575 | B1 | * | 7/2001 | Anderson et al. | 700/221 |
| 6,273,411 | B1 | | 8/2001 | Viojuk | |
| 6,276,677 | B1 | | 8/2001 | Hommochi et al. | |
| 6,309,336 | B1 | | 10/2001 | Muessig et al. | |
| 6,349,242 | B2 | | 2/2002 | Mahaffey | |
| 6,779,319 | B2 | * | 8/2004 | Smith et al. | 53/493 |

OTHER PUBLICATIONS

Internet, Pitney Bowes, *Direct Connect™ Inserter Control System*, http://www.pb.com, Apr. 5, 2002, 1 page.

Internet, Pitney Bowes, *DM 9 Series Inserting System*, http://www.pb.com, Apr. 5, 2002, 1 page.

Internet, Pitney Bowes, *Production Mail Inserters*, http://www.pb.com, Apr. 5, 2002, 2 pages.

Internet, Pitney Bowes, *5 Series Desktop Inserting System*, http://www.pb.com, Apr. 5, 2002, 1 page.

*First Data DecisionQuest™ Service*, First Data Resources Inc., pp. 1–364.

* cited by examiner

SYSTEMS FOR ASSEMBLING MAILINGS AND METHODS FOR EXTERNAL CONTROL THEREOF

CROSS-REFERENCES TO RELATED APPLICATIONS

The present invention is related to U.S. patent application Ser. No. 10/029,122, entitled "Sheet Folding Systems & Methods", and filed on Dec. 21, 2001; U.S. patent application Ser. No. 10/045,589, entitled "System And Methods Of Providing Inserts Into Envelopes", and filed Nov. 8, 2001; U.S. patent application Ser. No. 10/036,653, entitled "Mail Handling Equipment And Methods", and filed Nov. 8, 2001; U.S. patent application Ser. No. 10/028,449 entitled "Real-Time Intelligent Packet-Collation Systems and Methods", and filed on Dec. 19, 2001; U.S. patent application Ser. No. 10/028,888, entitled "Weight Measuring Systems & Methods", and filed on Dec. 19, 2001; and U.S. patent application Ser. No. 10/232,045, entitled "Weight Measuring Systems & Methods For Weighing Items", and filed on Dec. 19, 2001. Each of the aforementioned applications is are assigned to an entity common herewith, and incorporated herein by reference for all purposes.

BACKGROUND OF THE INVENTION

The present invention is related to systems and equipment used in processing mass mailings of consumer related information, as well as methods for using such.

A large number of companies and organizations provide direct mailings to various consumers and other recipients. These typically include a piece of information related to the particular recipient at a cost related to the weight of the piece of information and associated packaging. This approach can be costly. In part to reduce this cost, multiple pieces of information have been included with a single mailing. This can lower the average cost associated with any single piece of information, but also renders the mailing less directed, thus reduces the average effectiveness of the mailings.

Yet further, providing a large amount of irrelevant or less relevant direct mailings may cause recipients to disregard all direct mailings through believing that they are generally irrelevant and do not warrant reading. Additionally, a large amount of direct mailings are detrimental to the recipients and the public in general as they must be disposed of, and ultimately end up in land fills.

Some companies that already send direct mailings have found it advantageous to include various additional information with such mailings. As just one example, various credit card companies provide offers with statements that are sent to credit card holders. An ability to provide increased control over the recipients receiving a particular direct mailing can thus be useful to such companies. One such company, First Data Corporation, the assignee of the present invention sends millions of statements out each month to credit card users. In addition to these statements, various additional information is included with at least some of these statements. FDC has developed its DecisionQuest product that allows a credit card company processing with FDC to choose which information that is to be included with a given statement. This product is used in relation to companies that process credit cards or other statements through FDC via FDC's mainframe, and statement schedules. The system does not allow for third party providers of information, or for companies that do not process credit card transactions through via FDC's mainframe to utilize the system. The system allows for business rules to be defined by a client processing via FDC's mainframe. These business rules indicate an information set to be provided with a statement, and ultimately delivered on the statement schedule. While this system has reduced the number of poorly placed mailings as discussed above, it can only operate on a standard statement schedule, and in relation to companies fully incorporated into the credit card processing system. Thus, among other things, there exists a need in the art to address the aforementioned limitations.

BRIEF SUMMARY OF THE INVENTION

The present invention provides systems and methods for assembling a mailing. The mailing can include one or more offer items along with one or more inserts. Various embodiments of the present invention provide for determining which inserts are to be combined with a given offer item, and then effectuating the assembly of the mailings via a computer controlled inserter. The determination of what inserts to include can be made by applying a rule set to a decision information upon reception of an external tickler. Thus, for example, the rule set can indicate that a particular insert is to be provided to all recipient's within a given zipcode that are over a defined age. As another alternative, the rule set can indicate that a recipient with a high income is to receive a heavier, more costly version of an insert. Using such an invention, the process of preparing offer items and/or inserting a defined insert set with an offer item can be computer controlled, and tailored to creating effective, direct mailings to individual recipients.

In operation, an entity other than the entity performing the assembly provides an external tickler, and in some cases one or more of a rule set and decision information. The rule set is applied to the decision information, and the results are transmitted to processing equipment including inserters, folders, printers, and/or stuffers for assembling a customized mailing for the indicated recipient.

The determined insert set can be assembled and/or folded, and associated with an offer item addressed to the recipient. To this end, a folder can be used in relation to the present invention to prepare offer items and/or inserts to be included in a particular mailing item. Thus, for example, a set of unfolded and/or unprinted offer items can be folded in preparation for insertion into envelopes by an inserter. In addition, an inserter can be used to assemble the inserts and offer items, and stuff the assembled items into an envelope.

One particular embodiment of the present invention provides a system for selecting inserts that includes a multi-bay insert holder and an offer item associated offer item holder. Such an offer item holder can be one of the insert holders or a separate device where the offer item is held. In one particular instance, the offer item holder is a conveyor belt, and the insert holder is a bay or bin loaded with a number of the inserts. The system further includes a microprocessor that can access a computer readable medium comprising software. The software is executable by the microprocessor to receive an external tickler, receive one or more decision rules, receive decision information, and upon receiving the external tickler, apply the decision rule to the decision information. In addition, the software is executable to send a control signal to the multi-bay insert holder that indicates an insert associated with the multi-bay insert holder to be associated with the offer item. In some instances, the external tickler includes an indication of a scheduled offer item for a particular recipient. Such a scheduled offer item can be, for example, an account statement, a bill, an appointment notification, or the like.

In some instances, the decision rule indicates a threshold amount of the decision information at which the insert is to be provided to the recipient. Thus, for example, a particular insert may be provided to all individuals within a particular geographic location that are over age thirty. Examples of decision information can thus include location and age information for a group of individuals. Other decision information can include, but is not limited to, a credit limit, a personal income, an account type, a credit rating, an account balance, a number of dependents, and the like. In some instances, a plurality of data points within the decision information are operated on by the decision rule. For example, some decision rules operate on both age and income, while other decision rules operate on account type and age. Based on this disclosure, one of ordinary skill in the art will appreciate a myriad of decision rules and decision information that can be used in accordance with embodiments of the present invention.

In some instances, the system includes two microprocessor based systems where one of the microprocessor based systems is locally coupled to the multi-bay insert holder, and the other is communicably coupled to the first microprocessor via a communication network. In such a system, the control signal can include a data packet provided by the communicably coupled microprocessor based system to the locally maintained microprocessor based system. In some cases, the control signal further includes an electrical signal based on the data packet and provided to the insert holder.

Other embodiments of the present invention provide methods for selecting inserts to be included with an offer item. Such methods include receiving an external tickler and a decision rule. Based on the external tickler, the decision rule is applied to a decision information to create an insert set. The insert set includes at least one insert to be associated with an offer item. In some cases, the decision information is provided from an external source, while in other cases, the decision information is provided by an entity associating the inserts with offer items. The method further includes associating the insert set with the offer item.

Yet other embodiments of the present invention provide methods for preparing customized insert sets for distribution with offer items. Such methods include providing a control interface that is operable to receive an external tickler and a decision rule in some cases, the control interface is a web page maintained by the entity associating inserts with offer items. The method further includes receiving the external tickler, and the decision rule. Based on the external tickler, the decision rule is applied to a decision information to create an insert set that includes at least one insert to be included with an offer item. The insert set is also associated with the offer item.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
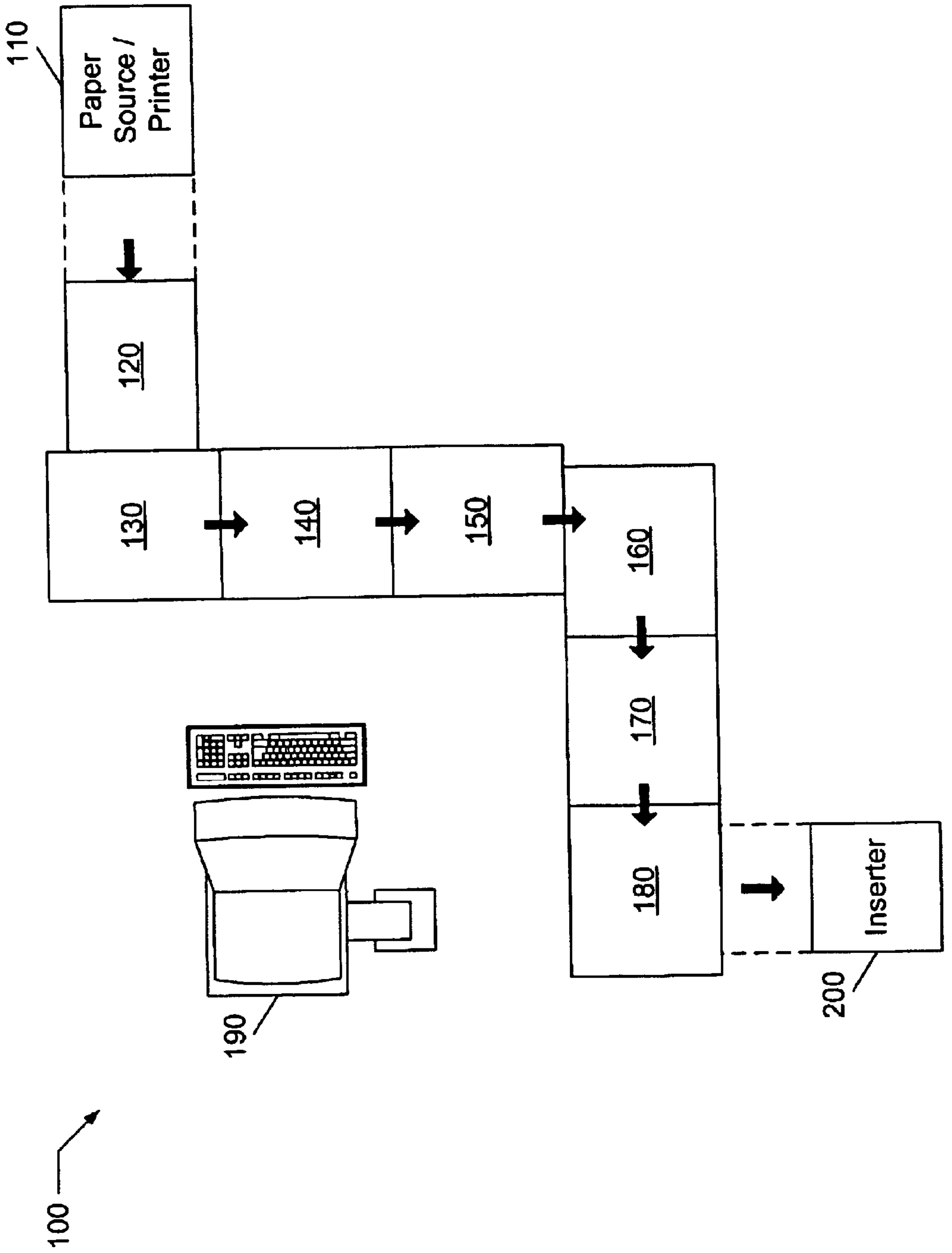
FIG. 1 is a simplified schematic of an offer item and/or insert folding system useful in relation to embodiments of the present invention.

The present invention provides systems and methods for assembling a mailing. The mailing can include one or more offer items along with one or more inserts. As used herein, an offer item can be any document or item that is scheduled to be sent to a given recipient. Thus, for example, an offer item can be a credit card, a credit card statement, an insurance bill, a phone bill, a driver's license renewal, an income tax form, or the like. As used herein, an insert can be any secondary information, document, or card provided to the recipient ancillary to the offer item. For example, an insert can be an advertisement, an informational document, a notice, an identification or value card, a false credit card provided as an incentive to obtain an actual credit card, a portion of the offer item itself including an informational of advertising message, and the like. As used herein, informational messages can be text, color coding, graphics, or otherwise communicative message.

Various embodiments of the present invention provide for determining which inserts are to be combined with a given offer item. This determination is made by applying a rule set to a decision information upon reception of an external tickler. As used herein, a rule set can be any set of rules that define a set of inserts that are to be provided to a particular recipient. For example, the rule set can indicate that a particular insert is to be provided to all recipient's within a given zipcode that are over a defined age. As another example, the rule set may include a weight limitation that indicates that all of a certain type of inserts should be included up to a given weight of the mailing. Further examples can decision based on shoe size, income, sex, past purchase history, current affiliations with groups or credit cards, or the like. Alternatively, an interface can be provided to allow definition of the rule set that provides a virtual weight of a given mailing. Thus, for recipients that do not represent a high potential for return, only a limited weight mailing may be provided, while a high potential return recipient may receive a heavier mailing. Based on the disclosure provided herein, one of ordinary skill in the art will appreciate the large number and variety of rule sets that can be defined to operate on any type of decision information. Using such an invention, the process of preparing offer items and/or inserting a defined insert set with an offer item can be computer controlled, and tailored to creating effective, direct mailings to individual recipients.

Further, as used herein, decision information is the data that determines whether a given rule set applies. Thus, in the preceding example, the decision information includes, but is not limited to, a recipient's age and address, or other characteristics or attributes. As used herein, an external tickler is trigger or event defined by an entity other than the entity responsible for performing the assembly process. Thus, for example, the present invention can include an entity providing an offer item file that includes statements to be mailed to one or more recipient's associated with the entity. In addition, the entity can provide a rule set and decision information, along with an external tickler indicating when the process of assembling and mailing should begin. As one of many advantages, using such an external tickler allows an external entity to provide an insert set based on an unlimited number of decision points, and on non-standard decision points. Such decision points can be almost any conceivable point of information in such a system triggered externally. Further, such an external tickler provides a mechanism whereby entities that are not otherwise processing on the system can access the system capabilities. Such accessing entities can thus access various efficiencies associated with postal discounts, including sophisticated weight management facilities and tools, white space management facilities and tools, as well as the various decisioning processes. These are just some of the advantages achieved through use of external triggering, and based on the disclosure provided herein, one of ordinary skill in the art will appreciate a myriad of other advantages.

Using this decision information and rule set, a computer can determine the inserts that are to be associated with the offer item. The determined insert set can be assembled and/or folded, and associated with an offer item addressed to the recipient. To this end, a folder can be used in relation to the present invention to prepare offer items and/or inserts to be included in a particular mailing item. Thus, for example, a set of unfolded and/or unprinted offer items can be folded in preparation for insertion into envelopes by an inserter.

An inserter is a system or device capable of associating one or more inserts forming an insert set with an offer item by, for example, inserting the insert set into an envelope with an offer item to create a mail item. In one embodiment of the present invention, a multi-bay inserter, i.e., an inserter with a plurality of insert holders is used. The multi-bay inserter includes a plurality of bays each holding a particular insert that forms part of the insert set to be associated with the offer item. In one particular case, the offer item is maintained in one of the bays of the inserter, in which case the offer item holder is identical to the insert holder. In other cases, the offer item is maintained in a separate area from the insert items. In operation, an envelope is conveyed past various bays of the inserter, and where the insert item in a particular bay is to be included in the mailing item, it is inserted. Otherwise, the particular insert item is not inserted.

FIG. 1 depicts a simplified schematic of a folding system 100 useful in relation to various embodiments of the present invention. System 100 includes a series of stations adapted to fold an offer item in preparation for inserting the offer item into an envelope for mailing. Offer items processed by system 100 can include one or more sheets of paper, such as a recipient billing statement, a new cardholder agreement, convenience checks, and the like. In addition, system 100 can be utilized to fold one or more inserts to be included with an offer item. As previously discussed, an insert can be an advertisement, or the like that is directed to the recipient of the offer item.

As illustrated, folding system 100 includes a receiver 130 adapted for receiving paper from a paper source 110. Paper source 110 may include, or be coupled to a printer for printing offer items and/or inserts. The printer may print, for example, alphanumeric characters to identify the recipient, the recipient's address, the recipient's billing information, and the like. The printer further may print bar codes and other identifying marks on the offer items and/or inserts. In one embodiment, paper source 10 is a continuous form paper source. In this manner, paper source 10 provides for the continuous printing of statements, convenience checks or the like for multiple recipients.

In one case, the continuous form sheet is fed into a separator 120. Separator 120 cuts or separates an offer item and/or insert to be folded from the continuous form sheet in order to, for example, distinguish one recipient's documents from another recipient's documents. Separator 120 also may remove an edge of the individual sheet, such as a perforated edge, tractor pins, or the like. Separator 120 can be, for example, a Laurenti Cutter, commercially available from EMC Document Systems, Inc., having its headquarters in Batavia, Ill. The individual sheet is received from separator 120 by a receiver 130. In this manner, a printer coupled to paper source 110 may print multiple recipient documents in series, with receiver 130 receiving documents for one recipient separately from the documents for another recipient. Receiver 130 transfers the sheet to a first folder 150, by way of a first sheet translation component 140. In another case, receiver 130 transfers the sheet directly to first folder 150.

First folder 150 performs a first fold of the paper sheet. The folded paper sheet is transferred to a second folder 180 by way of a second sheet translation component 160 and a third sheet translation component 170. As shown in FIG. 1, in one embodiment, translation components 160 and 170 are configured such that system 100 has an approximate ninety degree (90°) turn for sheets processed therethrough. In this manner, system 100 maintains a small footprint. Further, in one embodiment the ninety degree turn helps align the sheet for subsequent folds.

Second folder 180 performs a second fold of the paper sheet. In some embodiments, second folder 180 folds the sheet both a second and a third time. For example, second folder 180 may perform a half-fold of the folded sheet, a C-fold, a Z-fold, or the like. In one embodiment, an inserter system 200 is coupled to second folder 180. In this manner, the folded sheet may be transferred from second folder 180 to inserter 200 for subsequent insertion into an envelope or the like. Sheet processing times may vary through system 100. In one embodiment, the amount of time it takes a sheet received by receiver 130 to travel through system 100, including through second folder 180, is less than 0.5 seconds. In a particular embodiment, the sheet passes from receiver 130 though second folder 180 in about 140 milliseconds. System 100 is controlled by a controller 190, which is electrically coupled to system 100. Additional description of various folders useful in relation to the present invention, including the previously described folder can be found in U.S. patent application Ser. No. 10/029,122, entitled "Sheet Folding Systems & Methods", that was previously incorporated herein by reference. Based on the disclosure provided herein, one of ordinary skill in the art will appreciate that a number of folding systems and methods can be utilized in accordance with various embodiments of the present invention.

Figure 2A:
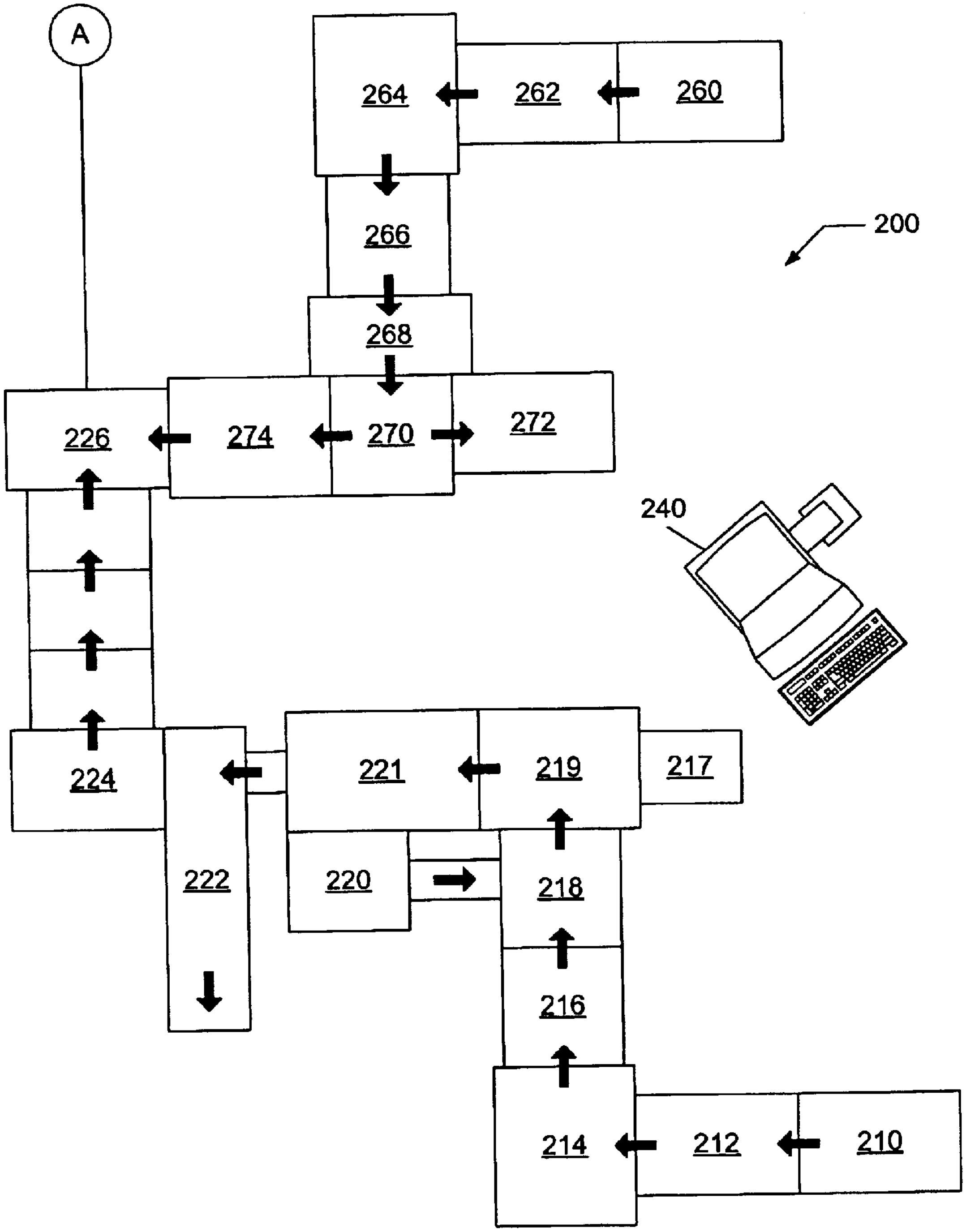
FIGS. 2A and 2B depict a simplified schematic of a mail inserting and processing system useful in relation to various embodiments of the present invention.
Figure 2B:
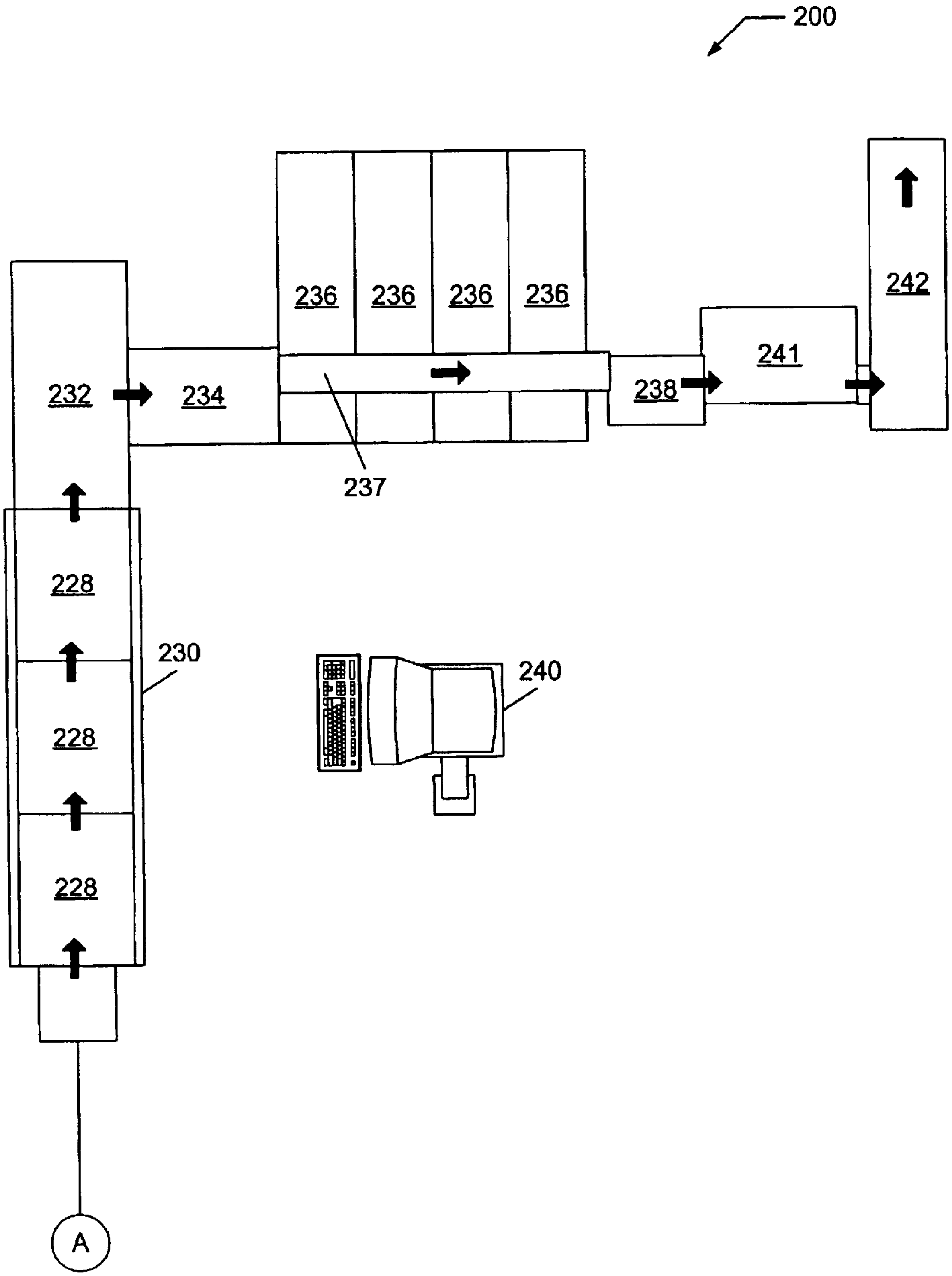

Turning now to FIG. 2, greater detail of inserter system 200 is provided. In particular, FIG. 2 depict a simplified schematic of a mail processing and inserting system 200 useful in relation to the present invention. System 200 includes a series of stations adapted to produce an envelope stuffed with a desired number of offer items and/or inserts. System 200 can either receive folded offer items and/or inserts from folding system 100, or can include printing and/or folding capability incorporated into the system. In the case shown in FIGS. 2A and 2B, system 200 includes a printer 210 adapted to print alpha numeric characters on a statement, a sheet of paper, a card carrier, or the like. Printer 210 prints information such as an account number, a customer name and mailing address, a monetary account limit, and the like, and further may print one or more bar codes. In one case, at least one of the bar codes identifies which inserts, from a plurality of different inserts, are to be sent to the customer with the statement or card.

The offer items (not shown) travel down a belt 212 and are stacked in a stacking unit 214. The offer items are then sequentially drawn from stacking unit 214 into unit 216. In one case, unit 216 includes a bar code reader for reading a bar code or other identification mark on the offer item. The bar code may, for example, identify which inserts are to be later matched up with the offer item. In another case, unit 216 also reads a number, such as a three digit number, associated with the offer item to facilitate proper matching with a card type insert having a corresponding number.

In one case, the offer item is transferred from unit 216 into unit 218. A card type insert is received from unit 220 and matched with the corresponding offer item in unit 218. In one case, the card type insert is glued, placed in slots or otherwise affixed to the offer item in unit 218. Additional details on unit 220 are described in conjunction with FIG. 3. The mated card offer item and card are transferred to unit 219. If a processing error has occurred, unit 219 deflects the card and card offer item into a bypass tray or receiving area 217. Processing errors may include, for example, mismatched cards and card offer items, and the like. If no error has occurred, unit 219 deflects the card and card offer item into a folding unit 221. As previously noted, the folding unit can be implemented separately. From the folding unit, the offer item and associated card can be forwarded a card detection assembly, that when an error is detected, such as too many cards or a missing card(s), the offer item is transferred to a bypass tray or receiving area in the direction shown by arrow 123. Transfer may occur along a conveyor belt, a track, or the like.

In one particular case, system 200 operates to place card type inserts in offer items, but is not used for processing further paper inserts. In this case, the offer item and associated card type insert(s) are passed down conveyor 222 in the direction of arrow 123, and removed from system 200. The offer items may, if desired, be transported to an envelope stuffing apparatus, a mail room or the like. In another case, system 200 operates to place paper insert sets with offer items, but not card type inserts. In yet another case, system 200 operates to place both card and paper type inserts with offer items. In such cases, if the card detection assembly does not indicate an error, offer items are then passed to a paddle wheel assembly 224 to continue processing. As shown in FIG. 1A, paddle wheel 224 operates to place the offer item and card type insert(s) on a track or conveyor belt 230. The offer items proceed down belt 230, passing under a second paddle wheel assembly 226. In one case, second paddle wheel assembly 226 places a second insert on top of the offer items as they pass underneath. For example, the second insert may be an advertisement, additional information pertinent to the recipient or the like.

As shown in FIG. 2A, a second printer 260 is adapted to print out the numerical characters and/or bar codes on an insert or a set of inserts. For example, printer 260 may further print one or more pages of advertisements or other inserts for a given recipient. In one case, printer 260 is electrically coupled to the bar code reader in unit 216. In this manner, bar code reader 216 may read the bar code or other identification mark on the offer item processed through unit 216 and inform printer 260 that an insert set is needed to be matched up with the offer item. In one case, controller 240 facilitates the communication between unit 216 and printer 260. The printed insert set passes from printer 260 along a belt 262 and into a stacking unit 264. Stacking unit 264 is similar to stacking unit 214, and performs similar functions. For example, stacking unit 264 stacks a plurality of offer items, and then passes the offer items one at a time to unit 266. Unit 266 is similar to unit 216, and may include a bar code reader for reading a bar code or other identification marks on the offer item. The insert then passes to unit 268, where the insert can be folded. The insert passes into unit 270, which in one case is a deflection unit 270 similar to unit 219 described above. Deflection unit 270 passes inserts to bypass station 272 in the event the insert is not to be matched with the present offer item. For example, bypass unit 272 receives inserts that may have been printed in error. Deflection unit 270 further directs inserts to belt 127 for transporting inserts to second paddlewheel 226. The insert is then matched with the offer item as described above.

Figure 3:
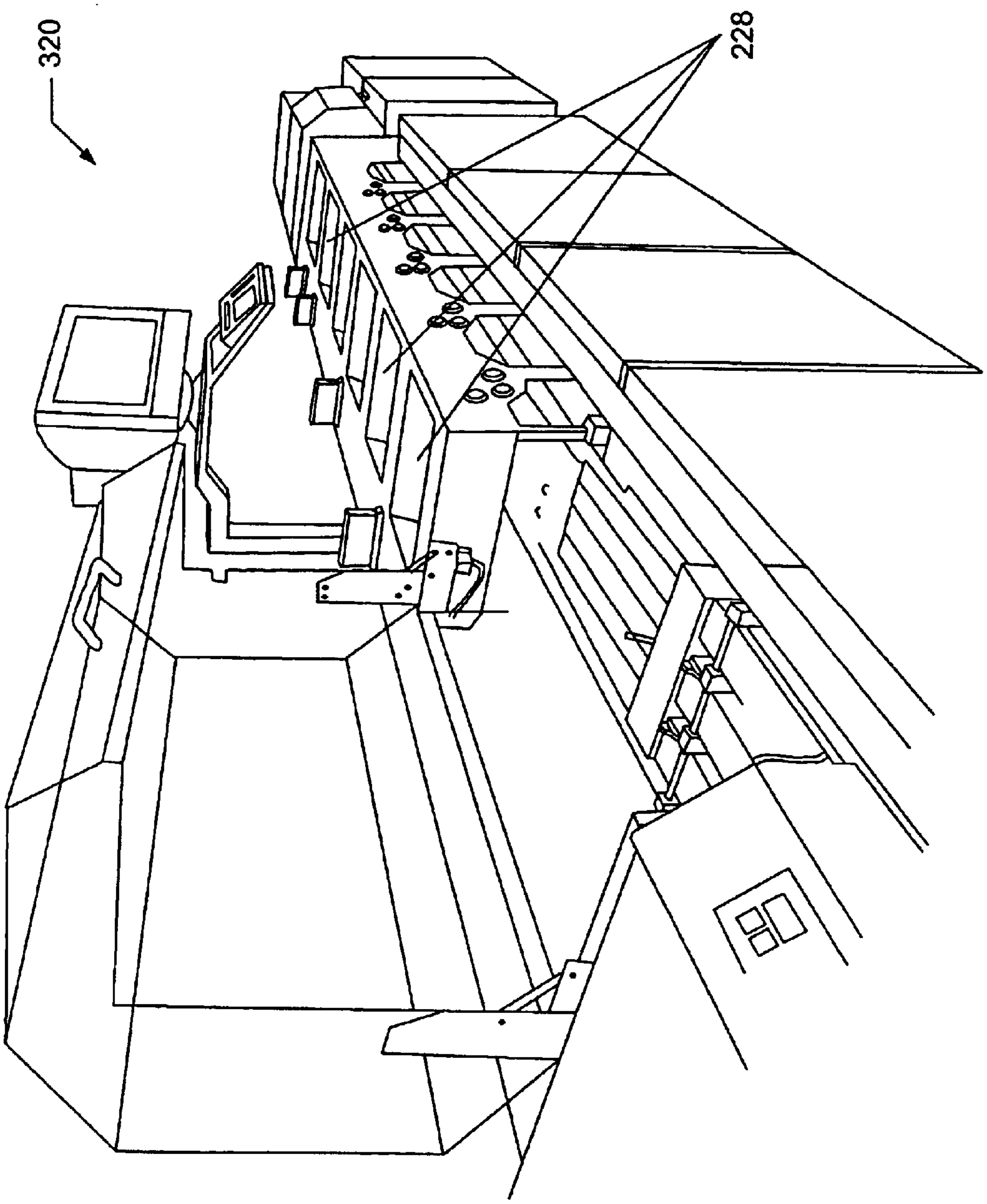
FIG. 3 is an overall view of a portion of a mail inserting and processing system of FIG. 2.

In some embodiments, printer 260 is not included as all inserts are provided from pre-prepared inserts loaded into one or more insert bays or holders 228 that can be loaded with a variety of inserts as depicted in FIG. 3. Alternatively, both printed and pre-prepared inserts can be included. The matched insert sets and offer items proceed along a track or conveyor belt 230, passing under one or more insert bays 228. FIG. 2B depicts three (3) insert bays 228, although a larger or smaller number of bays 228 also may be used within the scope of the present invention. In one particular case, system 200 includes as many as one hundred insert bays 228.

Insert bays 228 contain inserts, such as paper advertisements and informational inserts. These inserts may be added to a particular recipient's stack of offer items and/or card type inserts passing beneath on belt 230. Inserts contained within bays 228 may be selectively chosen based upon a number of criteria, including customer interest and other factors. For the system 200 shown in FIG. 2B having three bays 228, some recipients may receive all three inserts, other recipients may receive less than three inserts, while still other recipients may receive no inserts. The selected combination of inserts forms the insert set that is provided to the given recipient. In some cases, the insert set can include inserts from inert bays 228, the aforementioned card type inserts, and/or printed inserts created on printer 260.

In one case, the offer items traverse along belt 230 positioned underneath bays 228. In one case, belt 230 provides continuous, fluid movement of the statements. In another case, belt 230 provides incremental movement of the offer items, with each offer item stopping below each bin 228. Inserts desired to be matched with a particular recipient's offer item are pulled from bays 228 and placed atop the recipient's statement. Upon reaching the end of belt 230, the stack of offer items and associated inserts be sent to the recipient are transferred to unit 232 for insertion into an envelope.

The now stuffed envelope, containing a particular recipient's offer item, printed paper inserts, pre-prepared inserts, and/or card type inserts is sent to an envelope sealing unit 234. Envelope sealing unit 234 sprays a mist of water or other fluid on the envelope flap and proceeds to seal the moistened flap. Unit 234 further flips the stuffed envelope over to expose the envelope front. In one case, envelopes processed through system 200 are windowed envelopes, with information printed on the offer item or other insert exposed through the envelope window. The envelopes proceed into one or more diverters 236. Diverters 236 may divert stuffed envelopes for a variety of reasons, including, but not limited to, additional processing errors, and envelopes requiring special or additional handling. In one case, at least one diverter 236 is used for stuffed envelopes to be sent by overnight courier, such as Federal Express. In another case, at least one diverter is used to receive envelopes intended to be sent by airmail, or the like. Envelopes intended for standard mail delivery, such as by the U.S. Postal Service First Class Delivery, are put past diverters 236 along belt or track 237 and proceed to a first postage meter 238. First postage meter 238 applies a one ounce postage to envelopes requiring only a single ounce of postage. Envelopes proceed to a second postage meter unit 240, in which a second ounce of postage is applied. Alternatively, the entire two ounce postage is applied in second postage meter station 241, with the envelope passing first postage meter station 238 without receiving postage. The envelopes have now been properly stuffed, sealed, and postaged and proceed to an output station 242. The envelopes then may be received from output station 242 for delivery to the intended customers.

System 200, in one case, includes one or more controllers 240 for monitoring and/or controlling the process through system 100. An operator may view the status of documents on the computer screen associated with a particular controller 240, and/or input data as needed into controller 240 to facilitate operation of system 200. Further, controllers 240 facilitate the coordination between printers 210, 260, bar code readers in system 200 and insert bays 228, to ensure each recipient receives the desired inset set. Additional information about an inserter similar to that previously described can be found in U.S. patent application Ser. No. 10/045,589, entitled "System And Methods Of Providing Inserts Into Envelopes," filed Nov. 8, 2001, which was previously incorporated herein for all purposes. Based on the disclosure provided herein, one of ordinary skill in the art will appreciate that a variety of inserters and/or processing systems can be used in relation to the present invention. For example, another insertion system is disclosed in U.S. patent application Ser. No. 10/036653, entitled "Mail Handling Equipment And Methods," filed Nov. 8, 2001, and was also previously incorporated herein by reference for all purposes.

Figure 4:
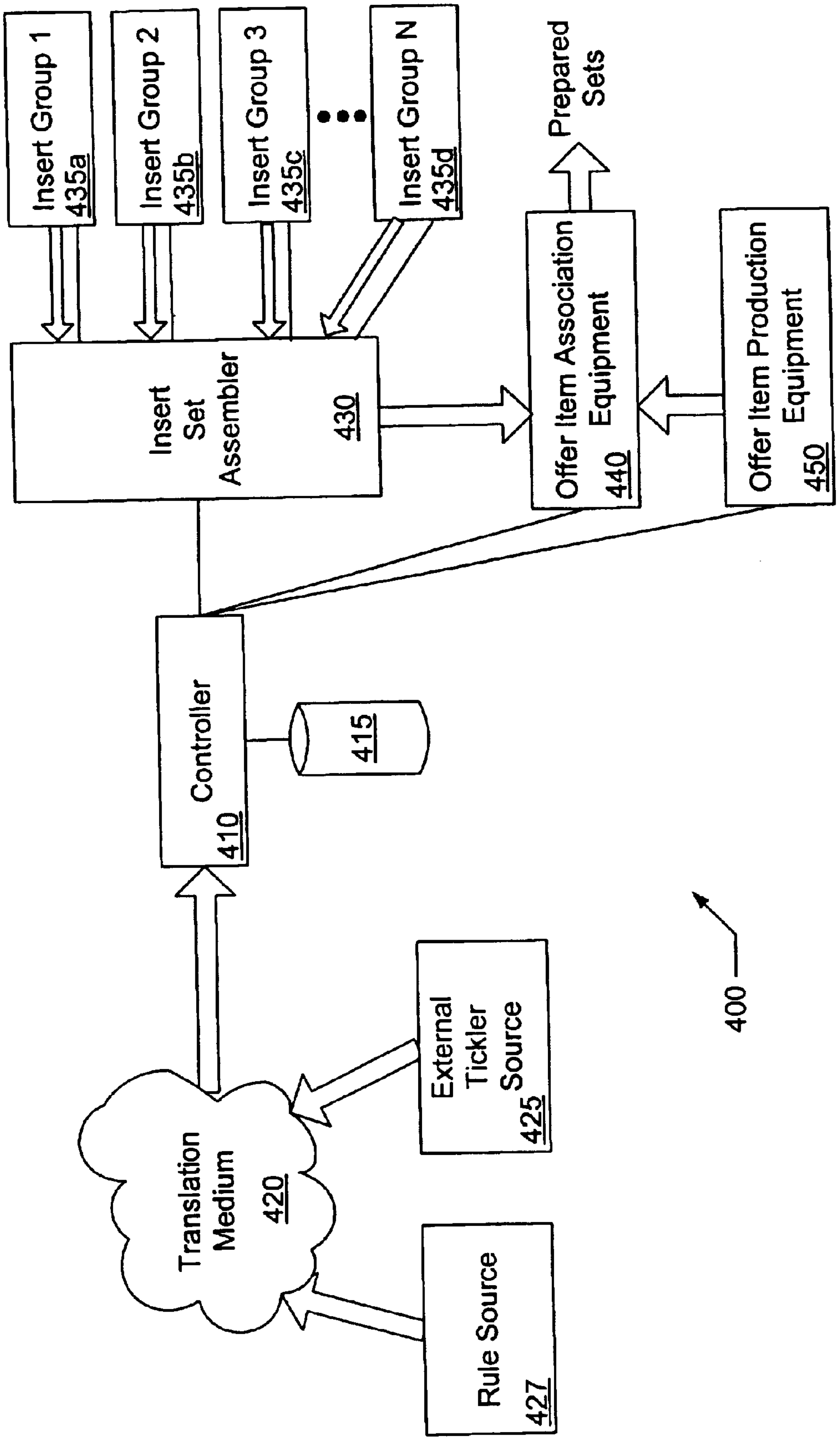
FIG. 4 is a system in accordance with embodiments of the present invention including an inserter and processor coupled to an external control set.

Turning to FIG. 4, a system 400 in accordance with embodiments of the present invention is depicted. System 400 includes a controller 410 and an associated database 415 that are in some way coupled to an external tickler source 425 and a rule source 427 via a transaction medium 420. Controller 410 can be any microprocessor based device that is capable of executing software instructions. In one embodiment, controller 410 is a personal computer (PC). Database 415 is capable of maintaining information in a format accessible to controller 410. Such information can include software instructions for operating system 400, one or more decision rules provided by rule source 427, one or more external ticklers obtained from external tickler source 425, and/or decision information. Such decision information can be provided from an external source (not shown), or maintained in relation to the entity providing controller 410. Transaction medium can be any medium capable of transmitting information from external sources to the entity maintaining controller 410. Thus, for example, transaction medium 420 can be the Internet and the entity providing controller 410 can provide one or more web pages tailored for providing information to the entity. In some embodiments, such web pages can be tailored to provide an estimated weight of offer item and associated insert set to allow for defining the rule set to assure that the maximum number of inserts are provided for a given amount of postage. Such a weight mechanism can apply the rule set to decision information, and identify the greatest number of inserts that will be included with a given offer item. Based on this, a maximum weight can be calculated and a postage associated therewith. Thus, when defining the rule set, one may take into account the postage considerations. Alternatively, or in addition, weight considerations can be included in the rule set. For example, the rule set may include an indication that only recipients with an income in excess of one amount may receive up to three ounces of inserts, while a recipient with lower income may only receive up to two ounces of inserts. In this way, a provider of inserts can maximize the return achieved through the inserts.

Alternatively, transaction medium 420 can be some other proprietary electronic network. As yet another alternative, transaction medium 420 can be a physical transfer medium. Thus, for example, electronic information may be saved to a diskette or CD ROM and sent to the entity maintaining controller 410. The entity can then upload the contained information to database 415. As another example, a paper copy of the information may be provided to the entity via transaction medium 420. This paper copy can then be translated to an electronic form and provided to database 415. Based on the disclosure provided herein, one of ordinary skill in the art will recognize a number of implementations of transaction medium 420 and methods from uploading information to database 415.

In some cases, external tickler source 425 and rule source 427 can be implemented in software. Using such software, a rule set can be defined that will be applied to decision information. In addition, an external tickler can be defined. In some cases, the external tickler is implicit in the rule set. For example, when the rule set is provided to controller 410, it is understood that the assembly of appropriate insert sets is to begin at that point, or within a reasonable time thereafter. Thus, the external tickler is actually the act of providing an order to the entity maintaining controller 410. In other cases, the external tickler can indicate a scheduled time. Thus, for example, the external tickler may be a note or electronic form indicating a time period in which the assembly process is to bc performed. As a simple example, the external tickler can be a date associated with a rule set or decision information set.

In some cases, the external tickler can be provided by an entity that supplies inserts to be included with offer items that are scheduled for preparation. Thus, for example, an entity may provide an insert advertisement that it desires to be provided to all recipients of an electric bill. In this case, the rule set indicates all recipients of electric bills, and the external tickler indicates the next run of electric bills. In this way, an advertiser can use a database maintained by a provider of statements filtered through a given rules set to send desired advertisements directed to the particular recipients.

In other cases, the external tickler can be provided by an entity supplying the offer items. In some cases, the provider of inserts may pay the entity providing the offer items to send out various inserts up to a particular weight. In yet other cases, the external tickler can be provided by an entity supplying both offer items and the inserts. Sets of the inserts are assemble and associated with respective offer items on a custom basis based on the decision information and decision rules.

System 400 further includes one or more insert bays 435 that each hold a particular type of insert described as insert groups. Insert bays 435 are associated with an insert set assembler, that can be an inserter as described above, or some other type of inserter. Based on application of decision rules to decision information, it is determined which subset of inserts maintained in insert bays 435 that will be assembled into an insert set and sent to a particular recipient. Controller 410 can apply the decision rules to the decision information, and provide the appropriate control signals to insert set assembler 430.

In addition, offer item production equipment 450, such as that described above, can prepare one or more offer items to be sent to various recipients. In some cases, the received external tickler can indicate an offer item to be prepared, and a date on which the offer item is to be sent. In various cases, the offer items are provided from an external source, and included in one of the insert bays 435, rather than be produced. In such cases, the offer item production equipment may go unused, or is not included in system 400.

Using offer item association equipment 440, offer items are associated with respective insert sets that were customized for the individual recipients of the offer items. With the offer items associated with respective insert sets, the offer items and insert sets can be stuffed into envelopes and postaged for mailing.

Figure 5:
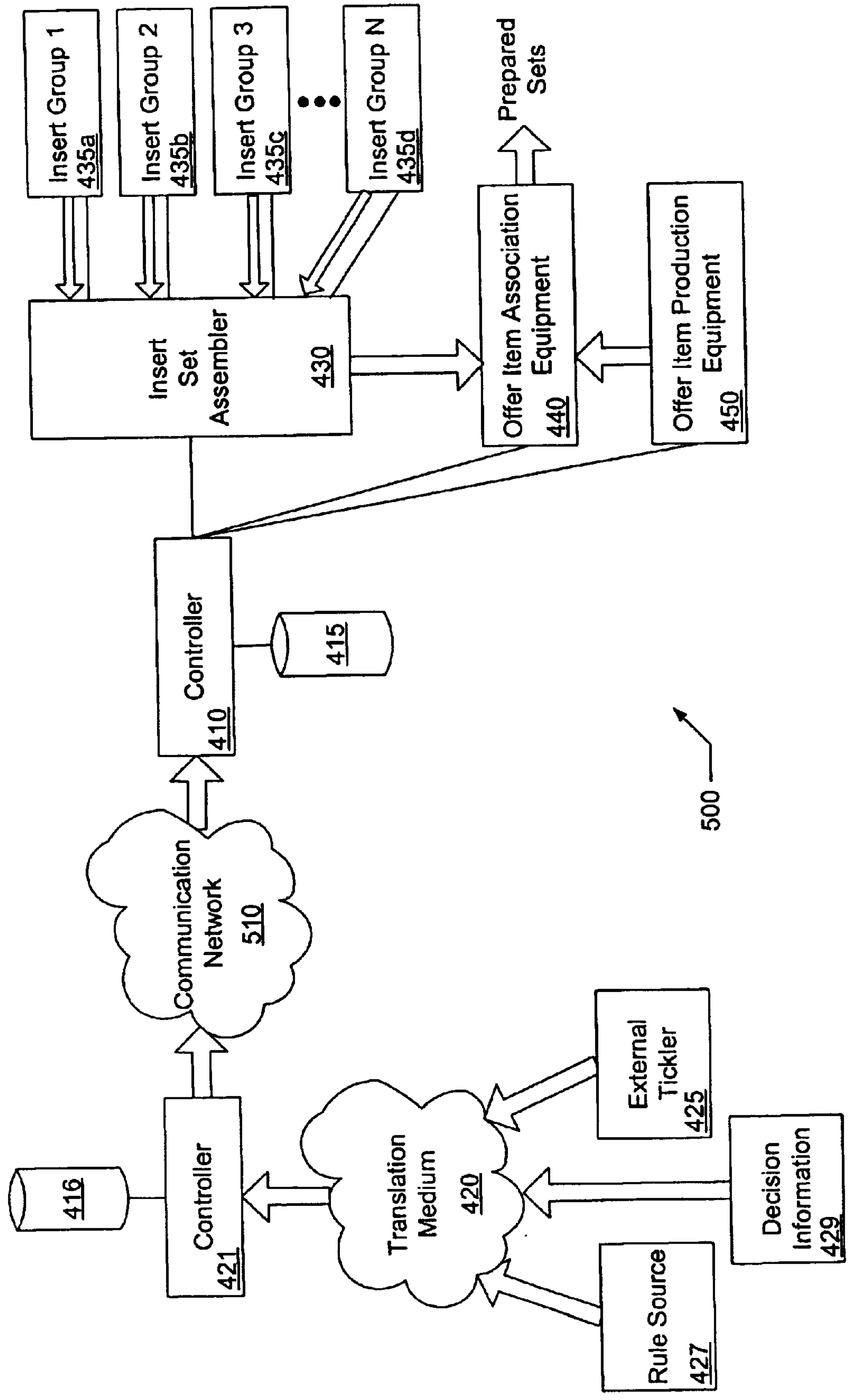
FIG. 5 is another system in accordance with various embodiments the present invention including an external controller and control set.

Turning to FIG. 5, a system 500 depicts other embodiments of the present invention. System 500 includes a communication network 510 communicably coupling controller 410 with an additional controller 421 that is associated with a database 416. In such an embodiment, controller 421 can be responsible for receiving rules sets from rule source 427, external ticklers from external tickler source 425, and/or decision information from decision information source 429 via transaction medium 420. Controller then applies the rule set to the decision information, and based on this, provides a command set to controller 410 that implements the assembly process as previously described. In some cases, controller 421 is a PC operated by an entity providing the external tickler. This PC can include software that provides for weight estimation, and a graphical user interface tailored to aid a user to define rule sets (decision rules), to format decision information, and to incorporate weight information into a rule set as previously described. Further, the software can be tailored to aid a user in designing an offer item that will be prepared using offer item production equipment 450.

Communication network 510 can be any communication network capable of providing communications between the controller 421 and controller 410. In some embodiments, communication network 510 is the Internet providing message based communication. In other embodiments, communication network 510 comprises a TCP/IP compliant virtual private network (VPN). However, it should be recognized that other communication networks could be used to provide similar functionality. For example, communication network 510 can be a local area network (LAN), a wide area network (WAN), a telephone network, a cellular telephone network, a virtual private network (VPN), the Internet, an optical network, a wireless network, or any other similar communication network or combination thereof.

Figure 6:
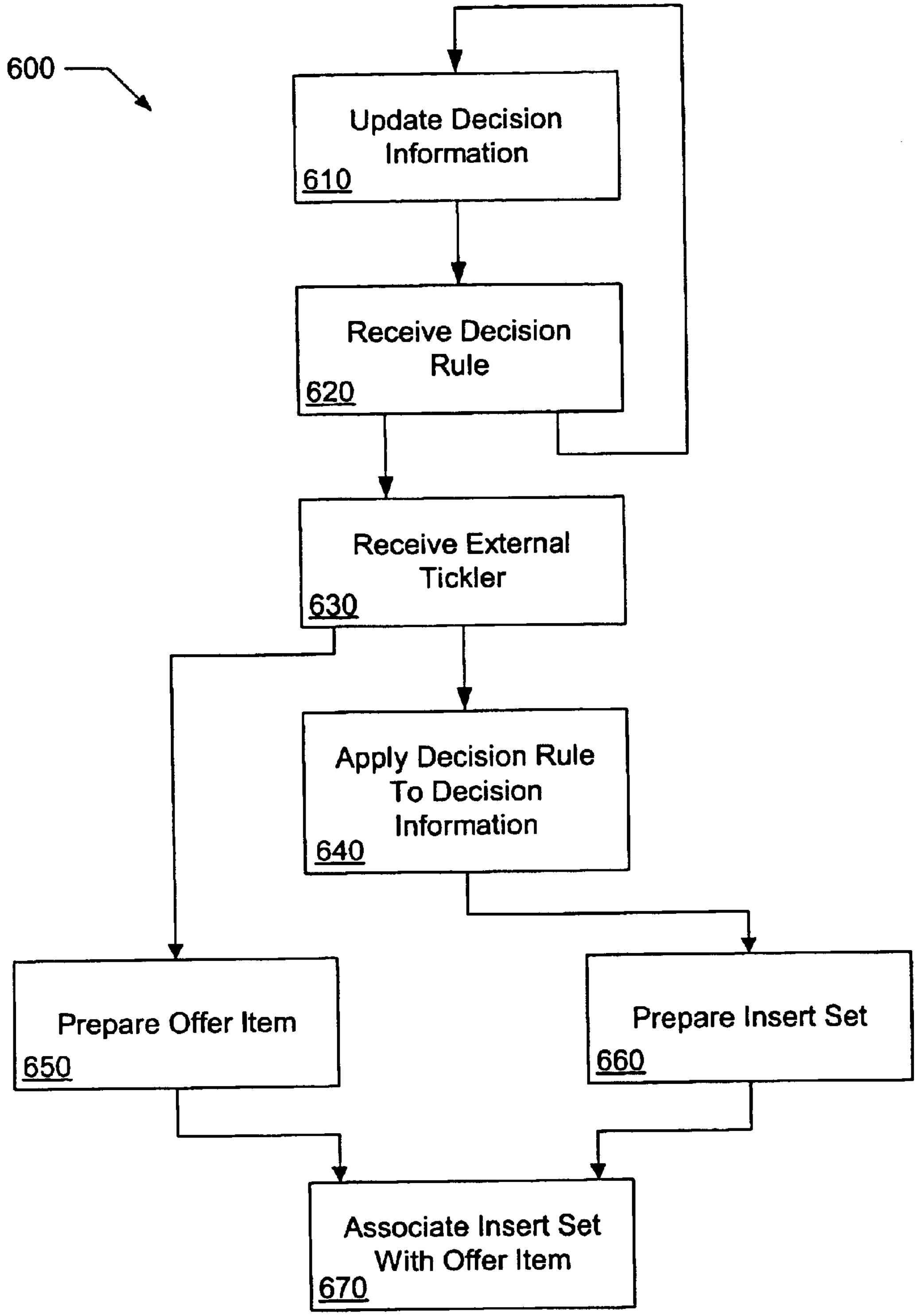
FIG. 6 is a flow diagram illustrating a method in accordance with some embodiments of the present invention.

Turning to FIG. 6, a flow diagram 600 depicting a method in accordance with some embodiments of the present invention is provided. Following flow diagram 600, decision information is updated (block 610). This can be done in a number of ways. For example, the decision information may be updated by an advertiser that is involved in market analysis and identifying potential consumers. Alternatively, this information can be updated by a credit card company, or other company providing accounts for consumers. As previously discussed, this information can include varying levels of information about a group of recipients. For example, decision information can include the age, address, income, and sex for each recipient in the group. Based on this disclosure, one of ordinary skill in the art will appreciate the myriad of data points that can be maintained about various recipients, and the various methods of gathering and updating such information.

In some embodiments of the present invention, decision information is maintained and/or gathered by the entity that is providing the decision rules and/or the external tickler. In such a case, the entity provides the decision information in addition to the decision rules. In other embodiments of the present invention, the decision information is maintained and/or updated by the entity that is responsible for assembling insert sets for inclusion with offer items as previously discussed. In such cases, the entity providing the decision rules is in effect borrowing or renting the decision information to market via inserts that are custom directed to particular recipients included within the decision information. In yet other embodiments, the decision information is gathered and/or maintained by a third party. In such a case, an entity providing decision rules and/or external ticklers can indicate the location of the third party data to be used in direct marketing to recipients indicated by the decision rules.

Figure 7:
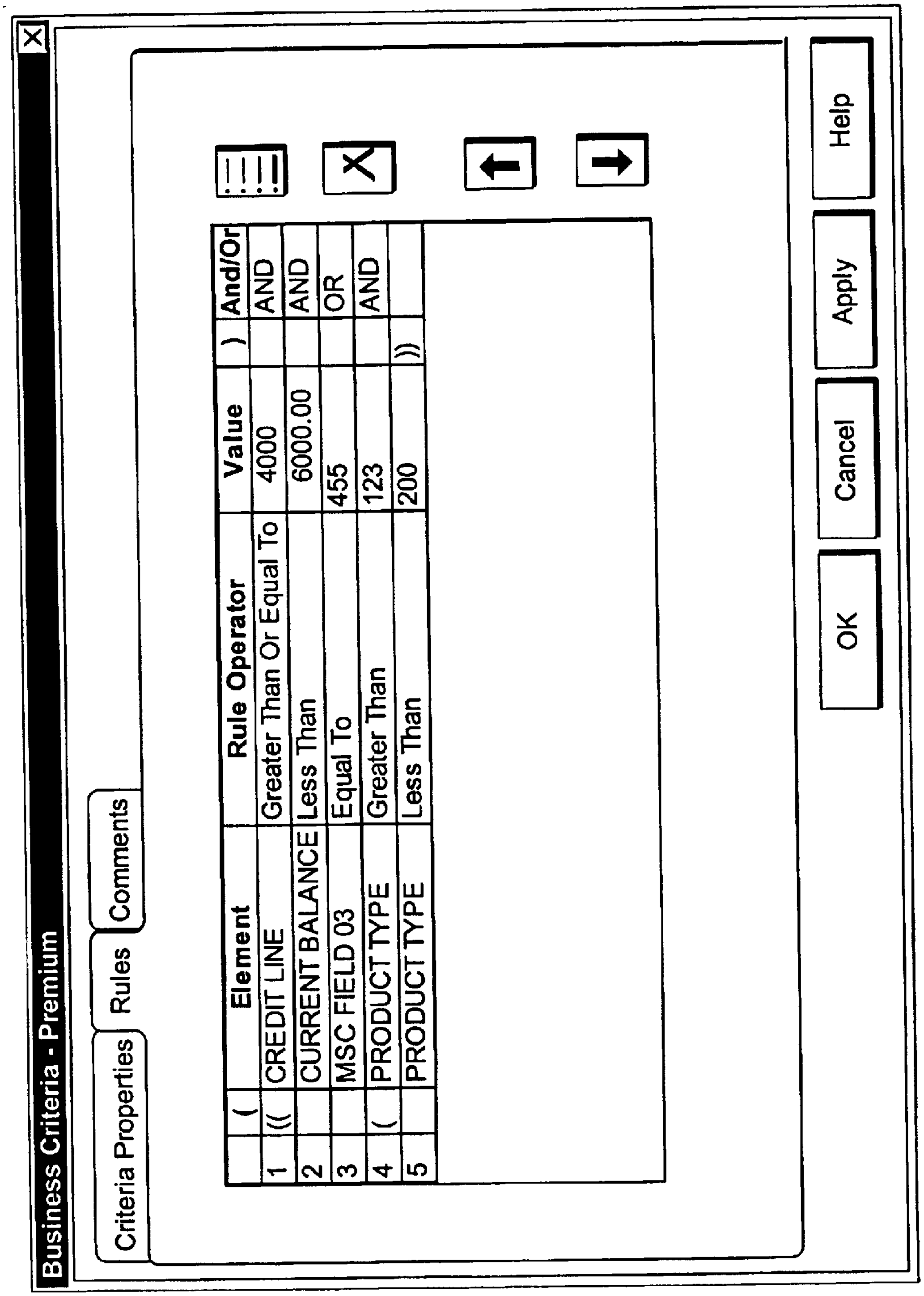
FIG. 7 is an exemplary interface useful in relation to various embodiments of the present invention.

In addition to gathering, maintaining and/or updating decision information (block 610), decision rule information is received (block 620). As previously described, such decision rules can indicate a subset of a particular recipient pool that are to receive a prescribed type of insert(s). In some cases, a decision rule tool is provided. Such a tool can be a graphical interface tailored to help a user define one or more decision rules. In some cases, the tool provides a graphical interface allowing a user to select between more than five thousand combinations of inserts that can be tailored through a canned set of three hundred or more decision criteria operating on one hundred or more data points within the decision information. Such tailoring can assure that an insert can be provided where it will have its greatest effect, but not provided where its effect is likely to be negligable. This gets the maximum possible effect, while reducing the costs associated with direct marketing. FIG. 7 depicts one exemplary interface of a decision rule tool. Based on the disclosure provided herein, one of ordinary skill in the art will appreciate that any number of decision rule tools can be used in relation to various embodiments of the present invention.

Following flow diagram 600 of FIG. 6, the processes of defining decision rules, and those rules being received (block 620), as well as, gathering and updating decision information (block 610) are repeated as often as desired. An external tickler can be received (block 630). This external tickler, as previously described, is an indication to start the assembly process. In some cases, the receipt of the external tickler initiates application of the decision rules to the decision information (block 640) resulting in the definition of insert sets to be included with mailings to particular recipients. Controls are then formed based on application of the decision rules to cause the various insert sets to be formed (block 660). In addition, where an offer item is to be prepared, it is done (block 650). Alternatively, the offer items can be provided. The offer items are then associated with insert sets that have been customized for the recipient of the offer item (block 670).

The invention has now been described in detail for purposes of clarity and understanding. However, it will be appreciated that certain changes and modifications may be practiced within the scope of the appended claims. For example, the present invention has been discussed in relation to particular folding and insertions systems, however, various other of such systems can be used in relation to the present invention. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A system for selecting inserts, the system comprising:

a multi-bay insert holder;

an offer item and an associated offer item holder; and a microprocessor associated with a computer readable medium, wherein the computer readable medium comprises instructions executable by the microprocessor to:

receive an external tickler;

receive a decision rule;

receive a decision information;

upon receiving the external tickler, apply the decision rule to the decision information; and sending a control signal to the multi-bay insert holder, wherein the control signal indicates an insert associated with the multi-bay insert holder to be associated with the offer item.

2. The system of claim 1, wherein the insert is an advertisement.

3. The system of claim 1, wherein the decision information is selected from a group consisting of a zip code and an area code.

4. The system of claim 1, wherein the external tickler includes an indication of a scheduled offer item for a particular recipient.

5. The system of claim 4, wherein the scheduled offer item is selected from a group consisting of:

an account statement;

a bill; and an appointment notification.

6. The system of claim 1, wherein the decision rule indicates a threshold amount of the decision information at which the insert is to be provided to the recipient.

7. The system of claim 6, wherein the decision information is selected from a group consisting of: a credit limit, a personal income, an account type, a credit rating, an age, an account balance, and a number of dependents.

8. The system of claim 1, wherein the decision information includes a plurality of data points, and wherein the decision rule operates on two or more of the plurality of data points.

9. The system of claim 8, wherein one of the plurality of data points is selected from a group consisting of:

an age and an income;

another of the plurality of data points is an account type; and the decision rule selects the insert based on both of the plurality of data points.

10. The system of claim 1, wherein the microprocessor is a first microprocessor, the system further comprising:

a second microprocessor, wherein the second microprocessor is locally coupled to the multi-bay insert holder, and wherein the first microprocessor is communicably coupled to the second microprocessor via a communication network.

11. The system of claim 10, wherein the control signal includes a data packet provided by the first microprocessor to the second microprocessor.

12. The system of claim 11, wherein the control signal further includes an electrical signal based on the data packet and provided to the insert holder.

13. A method for selecting inserts for inclusion with an offer item, the method comprising:

receiving an external tickler;

receiving a decision rule;

based on the external tickler, applying the decision rule to a decision information to create an insert set, wherein the insert set includes at least one insert to be included with an offer item; and associating the insert set with the offer item.

14. The method of claim 13, wherein associating the insert set with the offer item includes providing a control signal to a multi-bay insert holder.

15. The method of claim 13, wherein the insert is an advertisement.

16. The method of claim 13, wherein the decision information is selected from a group consisting of a zip code and an area code.

17. The method of claim 13, wherein the decision information includes a plurality of data points, and wherein the decision rule operates on two or more of the plurality of data points.

18. The method of claim 13, wherein the external tickler includes an indication of an offer item that is scheduled for a particular recipient.

19. The method of claim 18, wherein the offer item is selected from a group consisting of:

an account statement;

a bill; and an appointment notification.

20. A method for preparing customized insert sets for distribution with offer items, the method comprising:

providing a control interface, wherein the control interface is operable to receive an external tickler and a decision rule;

receiving the external tickler, and the decision rule;

based on the external tickler, applying the decision rule to a decision information to create an insert set, wherein the insert set includes at least one insert to be included with an offer item; and associating the insert set with the offer item.

21. The method of claim 20, wherein associating the insert set with the offer item includes providing a control signal to a multi-bay insert holder.

22. The method of claim 20, wherein the insert is an advertisement.

23. The method of claim 20, wherein the decision information is selected from a group consisting of a zip code and an area code.

24. The method of claim 20, wherein the decision information includes a plurality of data points, and wherein the decision rule operates on two or more of the plurality of data points.

25. The method of claim 20, wherein the external tickler includes an indication of an offer item that is scheduled for a particular recipient.

26. The method of claim 25, wherein the offer item is selected from a group consisting of: an account statement; a bill; and an appointment notification.

* * * * *

UNITED STATES PATENT AND TRADEMARK OFFICE

CERTIFICATE OF CORRECTION

PATENT NO. : 6,829,519 B2 Page 1 of 1
DATED : December 7, 2004
INVENTOR(S) : Kelly A. Liberty et al.

It is certified that error appears in the above-identified patent and that said Letters Patent is hereby corrected as shown below:

Title page,
Item [75], Inventors, should read:
-- [75] Inventors: Kelly A. Liberty, Omaha, NE (US);
Dan Oswald, Papillion, NE (US);
Gerald F. Gross, Omaha, NE (US);
Michelle Marie Ellwanger, Omaha, NE (US);
Clinton W. Johnson, Ft. Calhoun, NE (US); and
Christina Provost, Omaha, NE (US). --

Signed and Sealed this

Fifth Day of July, 2005

JON W. DUDAS
*Director of the United States Patent and Trademark Office*

UNITED STATES PATENT AND TRADEMARK OFFICE

CERTIFICATE OF CORRECTION

PATENT NO. : 6,829,519 B2 Page 1 of 1
DATED : December 7, 2004
INVENTOR(S) : Kelly A. Liberty et al.

It is certified that error appears in the above-identified patent and that said Letters Patent is hereby corrected as shown below:

Title page,
Item [75], should read:
-- [75] Inventors: Kelly A. Liberty, Omaha, NE (US);
Dan Oswald, Papillion, NE (US);
Gerald F. Gross, Omaha, NE (US);
Michelle Marie Ellwanger, Omaha, NE (US);
Clinton W. Johnson, Ft. Calhoun, NE (US); and
Christina Provost, Omaha, NE (US). --.

Signed and Sealed this

Sixth Day of September, 2005

JON W. DUDAS
*Director of the United States Patent and Trademark Office*